Sept. 21, 1943.  A. B. GARDELLA ET AL  2,329,833
HAND TOOL WITH ADJUSTABLE BLADE
Filed March 3, 1943
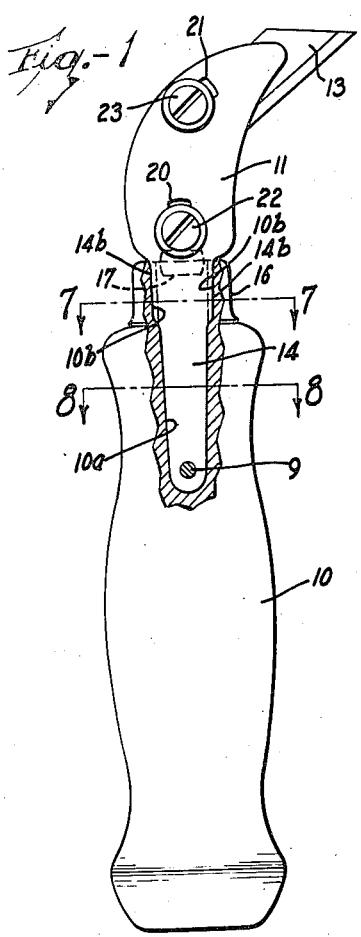
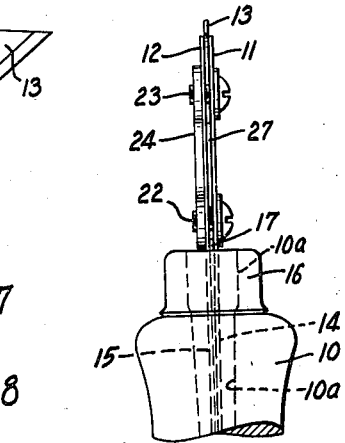
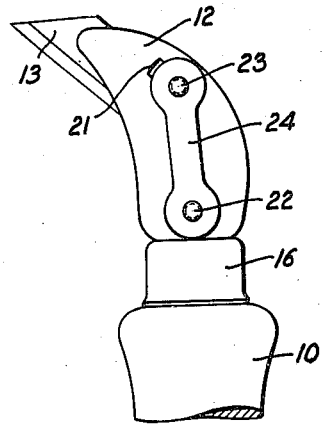
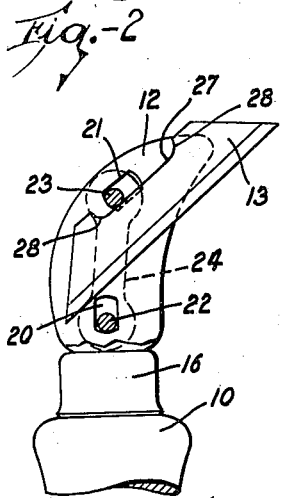
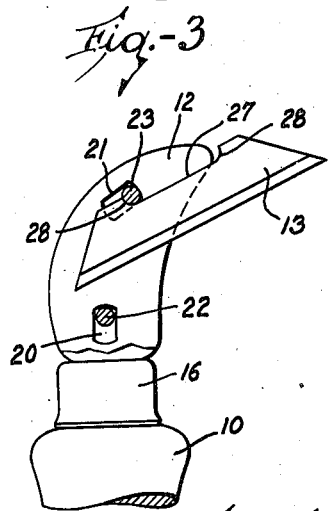
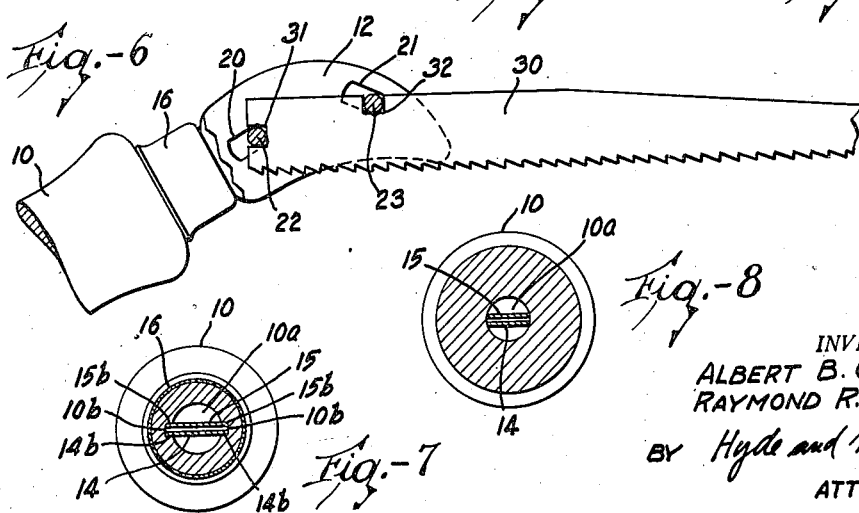
INVENTOR.
ALBERT B. GARDELLA
RAYMOND R. WARD
BY Hyde and Meyer
ATTORNEYS.

Patented Sept. 21, 1943

2,329,833

UNITED STATES PATENT OFFICE 2,329,833

HAND TOOL WITH ADJUSTABLE BLADE

Albert B. Gardella, Cleveland, and Raymond R. Ward, Brecksville, Ohio

Application March 3, 1943, Serial No. 477,796

14 Claims. (Cl. 30—320)

The invention relates to a novel and improved hand tool, and more particularly to a tool of this type especially adapted to cutting, scraping or smoothing operations.

One object of the invention is to provide a cutting tool equipped with novel means for preadjusting and predetermining the depth of the cut formed thereby.

A further object is to provide means for preadjusting the angle of the cutting edge, so as to afford greater ease and convenience in controlling the angle of incidence of the cutting edge with respect to the work.

A further object of the invention is to provide, in combination, novel blade holding means, and a blade having portions shaped to be complementary to said holding means in such manner that blade adjustment is effected easily and rapidly.

A further object of the invention is to provide blade holding and adjusting means readily adapted to use with blades of varying purpose and character.

Other objects and advantages of devices embodying the present invention will appear from the following description of several embodiments thereof, reference being had to the accompanying drawing in which Fig. 1 is a side elevation of one embodiment of the invention, a portion of the handle being broken away;

Fig. 2 is an elevational view taken from the left of Fig. 1, a portion of the handle being broken away;

Fig. 3 is a view similar to Fig. 1 but from the opposite side thereof, a portion of the handle being broken away;

Fig. 4 is like Fig. 1, but the side plate towards the observer has been removed and other parts are broken away;

Fig. 5 is similar to Fig. 4 but the blade is shown in another position;

Fig. 6 is a view similar to Figs. 4 and 5, a different type blade being used with the apparatus;

Fig. 7 is a section taken on the line 7—7 of Fig. 1; and

Fig. 8 is a section taken on the line 8—8 of Fig. 1.

Before the invention here illustrated is specifically described, it is to be understood that the invention here involved is not limited to the details of construction or the specific arrangement of parts herein illustrated or described as the invention obviously may take other forms. It also is to be understood that the phraseology or terminology herein employed is for the purpose of description and not of limitation, the scope of the present invention being indicated by the appended claims.

With reference particularly to Figs. 1 to 4, the tool comprises a handle 10 which may be of any suitable size and contour. The handle carries blade clamping means consisting of a pair of substantially parallel, spaced side plates 11 and 12 adapted to receive and removably retain therebetween a cutting member or blade 13. In idle or unclamped position the side plates are spaced apart sufficiently to permit the blade to be freely moved to any desirable angular relationship with respect to the handle and side plates.

The side plates 11 and 12 are provided, respectively, with tang portions 14 and 15 which extend through an opening in a ferrule 16 and inwardly therebeyond into handle 10, as shown in Figs. 1, 2, 7 and 8. The handle is provided with an axial bore 10a suitably contoured to receive the tangs in a press fit relationship, the aperture in the present instance progressively decreasing in cross sectional dimensions, as shown in Figs. 1 and 2, to conform to the slight taper of the tangs. The aperture is further provided with opposed slots 10b which receive somewhat enlarged portions 14b and 15b of the tangs, as best seen in Figs. 1 and 7. Seating of the enlarged portions of the tangs in slots 10b prevents rotation of the blade holding assembly within the handle. Anchoring of the assembly may be further assured by inserting a pin 9 or similar fastening means through the handle and tangs.

A spacer or shim 17 is disposed between the side plates at approximately their point of emergence from the ferrule 16. This shim is substantially of the same thickness as that of blade 13 so as to permit overall surface engagement of the side plates with that portion of the blade contiguous thereto.

The side plates are equipped with aligned slotted apertures 20 and 21 to receive the shanks of a pair of machine screws 22 and 23, the shank ends being threaded to fit complementary threaded apertures in a strap 24, said strap lying in lateral contact with the exterior surface of the side plate 11 through which said shank ends emerge. The side plates are relatively resilient and are assembled to have a slight tendency to spring apart, at least sufficiently to permit the blade 13 to be easily inserted to any desired position between the side plates. It is obvious that when the machine screws 22 and 23 are drawn up, the side plates are drawn together as a result of pressure of the screw heads against plate 11 and of the strap against plate 12.

After inserting the blade the screw 22 is drawn up sufficiently to gently grip the blade so as to retain it between the side plates but permit it to be moved or swung to the desired position. When such position is reached, screw 23 is taken up to greatly increase the frictional grip of the side plates on the blade. The use of a single strap 24 facilitates the whole operation since it is much easier to handle than two individual nuts, and its relatively fixed orientation eliminates the need of a wrench or gripping means while the screws are being turned up or slacked off.

The relatively large surface areas of the plates in frictional contact with the blade assures a fixed blade position despite the leverage developed during manipulation of the tool.

To move the blade to a new position it is only necessary to slack off the screws by a reverse turn or two without complete removal of the screws. Adjustment of the blade is facilitated by providing the blade with a distinctive contour which is designated to have a directive effect when such contoured portion is moved with respect to one or other of the aforesaid screws 22 and 23, or when the screw and blade assembly is moved as a unit by moving the screw shanks with respect to the slots or tracks 20 and 21. With this end in view the blade is provided with an elongated notch or recess 27 (Fig. 4) having terminal radius portions 28. Said recessed portion of the blade is movable with respect to a shank portion of one of the screws so that the blade may be rotated around the area of contact of shank and blade to the extent required by the character of the operation to be performed. Such adjustment of course is possible only when the screws are in relaxed position. The blade may also be subjected to endwise or angular movement by grasping the strap member 24 and moving it in such manner as to produce travel of the screw shanks in slots 20 and 21. As will be understood from the above description, the direction and extent of movement of the blade produced in this latter manner is responsive to the orientation, length, and contour of the slots, and to the relative positions of the blade and the screw shanks.

Figs. 4 and 5 show two different positions of the blade with respect to the holder. Variation in blade position is more or less a matter of individual choice, depending on the character of the work, the depth of the cut, and the amount of pressure required.

The depth of the cut is determined by the extent of the blade which protrudes beyond the confines of the side plates 11 and 12, said side plates serving as a stop when the blade is inserted so far that a surface portion of the plates contacts the article being cut.

Fig. 6 illustrates an embodiment wherein the handle and blade holding members are similar to those already described but wherein the cutting member is a fairly conventional saw blade. As shown, the saw blade 30 is provided with notches 31 and 32 which receive the screw shanks. When used in this way the handle position is of the pistol grip type. The angle of the blade 30 with respect to the handle is variable within limits by movement of the screw shanks in the slots as heretofore described.

We claim:

1. A hand tool, comprising a blade, and a handle having blade clamping means at one end thereof, said blade clamping means consisting of a pair of resilient and apertured side plates separated to provide a space therebetween for the reception of said blade, a pair of screws having their shanks extending through the apertures of said side plates and across the blade-receiving space, and a strap disposed alongside the outer surface of one of said side plates and having spaced and threaded apertures to receive said screw shanks, whereby said side plates may be drawn into clamping engagement with a blade positioned therebetween, said blade having a notch or recess to receive one of said screw shanks.

2. A hand tool, comprising a blade, and a handle having blade clamping means at one end thereof, said blade clamping means consisting of a pair of resilient and apertured side plates separated to provide a space therebetween for the reception of said blade, a pair of screws having their shanks extending through the apertures of said side plates and across the blade-receiving space, and a strap disposed alongside the outer surface of one of said side plates and having spaced and threaded apertures to receive said screw shanks, whereby said side plates may be drawn into clamping engagement with a blade positioned therebetween, said blade having an elongated notch or recess to receive one of said screw shanks, the elongated character of said notch or recess enabling the blade to be adjusted relative to said screw and hence relative to the tool handle as a whole.

3. A hand tool, comprising a blade, and a handle having blade clamping means at one end thereof, said blade clamping means consisting of a pair of resilient and apertured side plates separated to provide a space therebetween for the reception of said blade, spacing means of a thickness approximating the thickness of said blade retained between said side plates at their region of juncture with said handle, a pair of screws having their shanks extending through the apertures of said side plates and across the blade-receiving space, and a strap disposed alongside the outer surface of one of said side plates and having spaced and threaded apertures to receive said screw shanks, whereby said side plates may be drawn into clamping engagement with a blade positioned therebetween, said blade having an elongated notch or recess to receive one of said screw shanks, the elongated character of said notch or recess enabling the blade to be adjusted relative to said screw and hence relative to the tool handle as a whole.

4. A hand tool, comprising a blade having a substantially straight longitudinal cutting edge, and a handle having blade clamping means at one end thereof, said blade clamping means consisting of a pair of resilient and apertured side plates separated to provide a space therebetween for the reception of said blade, plate clamping means having a shank portion extending through an aperture of said side plates and across the blade-receiving space, whereby said side plates may be drawn into clamping engagement with a blade positioned therebetween, said blade having a notch or recess in its other longitudinal edge to engage said shank portion.

5. A hand tool, comprising a blade having a longitudinal cutting edge and inclined end edges, and a handle having blade clamping means at one end thereof, said blade clamping means consisting of a pair of resilient and apertured side plates separated to provide a space therebetween for the reception of said blade, each said side plate being provided with a tang projection secured within said handle, plate clamping means having a shank portion extending through an aperture of said side plates and across the blade-receiving space, whereby said side plates may be drawn into clamping engagement with a blade positioned therebetween, spacing means of a thickness approximating the thickness of said blade retained between said side plates near their point of juncture with said tang projections, said blade having a notch or recess in its other longitudinal edge to engage said shank portion.

6. A hand tool, comprising a blade having a substantially straight longitudinal cutting edge, and a handle having blade clamping means at one end thereof, said blade clamping means consisting of a pair of resilient and apertured side plates separated to provide a space therebetween for the reception of said blade, a screw having its shank extending through an aperture of said side plates and across the blade-receiving space, and a strap disposed alongside the outer surface of one of said side plates and having a threaded aperture to receive said screw shank, whereby said side plates may be drawn into clamping engagement with a blade positioned therebetween, said blade having a notch or recess in its other longitudinal edge to receive said screw shank.

7. A hand tool, comprising a blade having a longitudinal cutting edge and inclined end edges, and a handle having blade clamping means at one end thereof, said blade clamping means consisting of a pair of resilient and apertured side plates separated to provide a space therebetween for the reception of said blade, a screw having its shank extending through an aperture of said side plates and across the blade-receiving space, and a strap disposed alongside the outer surface of one of said side plates and having a threaded aperture to receive said screw shank, whereby said side plates may be drawn into clamping engagement with a blade positioned therebetween, said blade having a notch or recess in its other longitudinal edge to receive one of the shanks of said screws.

8. A hand tool, comprising a blade having a substantially straight longitudinal cutting edge, and a handle having blade clamping means at one end thereof, said blade clamping means consisting of a pair of resilient and apertured side plates separated to provide a space therebetween for the reception of said blade, means whereby said side plates may be drawn into clamping engagement with a blade positioned therebetween, said blade having a notch or recess in its other longitudinal edge to engage said plate clamping means, and spacing means of a thickness approximating the thickness of said blade retained between said side plates near their point of juncture with said handle.

9. A hand tool, comprising a blade having a longitudinal cutting edge and inclined end edges, and a handle having blade clamping means at one end thereof, said blade clamping means consisting of a pair of resilient and apertured side plates separated to provide a space therebetween for the reception of said blade, each said side plate being provided with a tank projection secured within said handle, a pair of screws having their shanks extending through the apertures of said side plates and across the blade-receiving space, and a strap disposed alongside the outer surface of one of said side plates and having spaced and threaded apertures to receive said screw shanks, whereby said side plates may be drawn into clamping engagement with a blade positioned therebetween, spacing means of a thickness approximating the thickness of said blade retained between said side plates near their point of juncture with said tank portions, said blade having a notch or recess in its other longitudinal edge to receive one of the shanks of said screws.

10. A hand tool, comprising a blade, and a handle having blade clamping means at one end thereof, said blade clamping means having a pair of resilient and slotted side plates separated to provide a space therebetween for the reception of said blade, a pair of screws having their shanks extending through the apertures of said side plates and across the blade-receiving space, and a strap disposed alongside the outer surface of one of said side plates and having spaced and threaded apertures to receive said screw shanks, the connection of said screw shanks by said strap permitting the screws to be simultaneously adjusted in the slots of said side plates, whereby said side plates may be drawn into clamping engagement with a blade positioned therebetween, said blade having a notch or recess in its other longitudinal edge to receive one of said screw shanks.

11. A hand tool, comprising a blade, blade clamping means, and a handle, said handle being provided with an axially bored aperture, said blade clamping means having a pair of resilient and slotted side plates separated to provide a space therebtween for the reception of said blade, each said side plate being provided with a tang portion seated within said aperture, a pair of screws having their shanks extending through the apertures of said side plates and across the blade-receiving space, and a strap disposed alongside the outer surface of one of said side plates and having spaced and threaded apertures to receive said screw shanks, the connection of said screw shanks by said strap permitting the screws to be simultaneously adjusted in the slots of said side plates, whereby said side plates may be drawn into clamping engagement with a blade positioned therebetween, said blade having a notch or recess in its other longitudinal edge to receive one of said screw shanks.

12. A hand tool, comprising a blade, blade clamping means, and a handle, said handle being provided with an axially bored aperture, said blade clamping means having a pair of resilient and slotted side plates separated to provide a space therebetween for the reception of said blade, each said side plate being provided with a tang portion seated within said aperture, the wall of said aperture being provided with opposed slots to receive enlarged portions of said tangs, a pair of screws having their shanks extending through the apertures of said side plates and across the blade-receiving space, and a strap disposed alongside the outer surface of one of said side plates and having spaced and threaded apertures to receive said screw shanks, the connection of said screw shanks by said strap permitting the screws to be simultaneously adjusted in the slots of said side plates, whereby said side plates may be drawn into clamping engagment with a blade positioned therebetween, said blade having a notch or recess in its other longitudinal edge to receive one of said screw shanks.

13. A hand tool, comprising a blade, blade clamping means, and a handle, said handle being provided with an axially bored aperture, said blade clamping means having a pair of resilient and slotted side plates separated to provide a space therebetween for the reception of said blade, each said side plate being provided with a tang portion seated within said aperture, the wall of said aperture being provided with opposed slots to receive enlarged portions of said tangs, a pair of screws having their shanks extending through the apertures of said side plates and across the blade-receiving space, and a strap disposed alongside the outer surface of one of said side plates and having spaced and threaded apertures to receive said screw shanks, the connection of said screw shanks by said strap permitting the screws to be simultaneously adjusted in the slots of said side plates, whereby said side plates may be drawn into clamping engagement with a blade positioned therebetween, said blade having a notch or recess in its other longitudinal edge to receive one of said screw shanks, and spacing means of a thickness approximating the thickness of said blade retained between said side plates near their point of juncture with said tang portions.

14. A hand tool, comprising a blade, and a handle having blade clamping means at one end thereof, said handle being provided with an axially bored aperture, said blade clamping means having a pair of resilient and apertured side plates separated to provide a space therebetween for the reception of said blade, plate clamping means having a shank portion extending through the aperture of said side plates and across the blade-receiving space, whereby said side plates may be drawn into clamping engagement with a blade positioned therebetween, each said side plate being provided with a tang portion seated within said aperture, the walls of said aperture being provided with opposed slots to receive enlarged portions of said tangs, said blade having a notch or recess in its longitudinal rear edge to receive said shank portion.

ALBERT B. GARDELLA.
RAYMOND R. WARD.